United States Patent [19]

Tasnadi nee Erosi

[11] Patent Number: 4,846,256
[45] Date of Patent: Jul. 11, 1989

[54] SHELL FOR PLATE-TYPE APPARATUS TO CARRY OUT THERMO-DYNAMIC PROCESSES BASED ON HEAT-EXCHANGE BETWEEN FLOWING FLUIDS

[75] Inventor: Krisztina Tasnadi nee Erosi, Budapest, Hungary

[73] Assignee: Energiagazdalkodasi Intezet, Budapest, Hungary

[21] Appl. No.: 849,948

[22] Filed: Apr. 9, 1986

[30] Foreign Application Priority Data

Apr. 9, 1985 [HU] Hungary ............... 1294/85
Aug. 30, 1985 [HU] Hungary ............... 1294/85

[51] Int. Cl.⁴ .............................. F25B 29/00
[52] U.S. Cl. ................................ 165/31; 165/166; 62/6
[58] Field of Search .............. 165/31, 39, 166, 46; 236/13; 62/6; 126/417, 419

[56] References Cited

U.S. PATENT DOCUMENTS 4,279,243  7/1981  Deakin ...................... 126/417
4,495,936  1/1985  Frommhold ............... 126/417

Primary Examiner—Henry A. Bennet
Attorney, Agent, or Firm—Young & Thompson

[57] ABSTRACT

Shell (e.g. 94) for plate-type apparatus to carry out thermo-dynamic processes based on heat exchange between flowing fluids which comprises spaced heat conductive confining plates (50a, 50b) and fluid conducting passages (56c, 56d, 56e) therebetween. At least one of the confining plates (50a, 50b) is provided with at least one diaphragm (58a, 58b) adjacent to a fluid conducting passage. The diaphragm (58a, 58b) in the confining plates (50a, 50b) ensures, in addition to heat transfer, also interactions of fluid pressures. Thus, positive circulation of fluids, operation of control valves, etc., are rendered possible by structure located within the shells themselves.

6 Claims, 15 Drawing Sheets

SHELL FOR PLATE-TYPE APPARATUS TO CARRY OUT THERMO-DYNAMIC PROCESSES BASED ON HEAT-EXCHANGE BETWEEN FLOWING FLUIDS

FIELD OF THE INVENTION

This invention relates to shells for plate-type apparatus to carry out thermo-dynamic processes based on heat-exchange between flowing fluids.

In the present specification and claims the term "shell" denotes units consisting of spaced heat-conductive confining plates and fluid conducting passages therebetween. They are either self-contained or are composed of loose confining plates with or without gaskets therebetween held together by axial pressure.

BACKGROUND OF THE INVENTION

Plate-type apparatus composed of shells for carrying out thermo-dynamic processes based on heat exchange between flowing fluids are already known in the art. Such apparatus are described e.g. in U.S. Pat. No. 4,497,689 the basic units of which are shells composed of spaced confining plates with fluid conducting passages therebetween. The significance of their employment consists in that any desired thermo-dynamic outputs of predetermined value are obtainable by selecting a suitable number of uniform shells. Thus, various apparatus can be composed of identic units which, in turn, may be made e.g. by automated robots in series production requiring but a few manufacturing operations.

A desired thermo-dynamic process such as evaporation or refrigeration is effected by fluids flowing in the passages of the shells and influencing each other through the heat conductive surfaces of the latter.

Circulation of the fluids is, as a rule, brought about by pumps outside the shells. Where fluid flow has to be effected inside hermetically and probably permanently closed shells as e.g. in refrigerators, the fluids are circulated by the action of heat. For such purpose the hermetically closed shells are provided with thermosiphons which are energized by heat sources located in adjacent shells.

Thus, hitherto known plate-type apparatus of the above described kind operate exclusively by means of heat exchange between fluids without any interaction of their pressures which are left unexploited. Therefore, it seems desirable to provide means by which, in addition to heat exchanges between fluids, also their pressure changes are enabled to be exploited. As will be seen, such possibility permits, on the one hand, to simplify shelled thermo-dynamic apparatus and, on the other hand, to extend their field of employment.

SUMMARY OF THE INVENTION

The present invention aims at complementing the state of the art with plate-type apparatus capable of exploiting, in addition to heat exchanges, also pressure interactions within the shells.

The main object of the present invention is, essentially, to provide means which permit to make use of both heat-exchanges and pressure-exchanges between fluids flowing in the passages of adjacent shells. In other words, the confining plates of the shells have to be rendered suitable to transmit, in addition to heat, also pressure differences between fluids which participate in such heat exchange.

The key idea of the solution to the above problem consists in providing one or more diaphragms in one or both of the confining plates of a shell. The diaphragms provided in the confining plates being pressure sensitive they will deflect on differences in pressures prevailing in passages of adjacent shells. Thus, in addition to their function as heat-transfer surfaces, the diaphragms will propagate pressures as well. A higher pressure prevailing in one shell is, thereby, transferable to a fluid of lower pressure flowing in an adjacent shell. The result may be positive circulation of the latter. However, a pressure difference may also be used for adjusting the flow resistances in the passages of one of adjacent shells by means of diaphragms operating control valves provided in such passages which is a significant advantage of the diaphragm principle suggested by the invention.

Summarily, the present invention represents an improvement of shells comprising, in a manner known per se, spaced heat-conductive confining plates and fluid conducting passages therebetween. The invention proper consists in that at least one of the confining plates comprises at least one diaphragm adjacent to a fluid conducting passage.

The diaphragm may be operated by a heat-carrying fluid which conveys the heat necessary for a thermo-dynamic process such as evaporation or which abducts heat in order to condense vapours formed in the course of such evaporation. Then the diaphragm is part of a heat-conductive surface. An advantage of such arrangement consists in that also the thermal action of the heat-carrying fluid is transmitted through the diaphragm by which increased efficiency of the apparatus will be obtained.

However, the diaphragm may be deflected by a fluid employed exclusively for such purpose. Then the shell will comprise a terminal diaphragm closing a passage for conducting the operating fluid. Thereby, the pressure acting on the terminal diaphragm can exactly be adjusted which is of particular significance when the diaphragm is used for obtaining a precise value of flow resistance by operating a control valve.

Moreover, it is possible to employ electromagnetically operated diaphragms which has the advantage that amplitude and frequency of diaphragm movements can exactly be changed within broad limits and the diaphragm can, as it were, be positively moved. This is of special importance when a mechanic rather than thermal function of the diaphragm is desired.

In case of a plurality of diaphragms also a mixed employment of such operating expedients is feasible. For instance, in case of two diaphragms one of them will be moved by an operating fluid whilst the other one is operated either by a heat-carrying fluid or electromagnetically.

It will be seen that the diaphragm of a shell as suggested by the present invention can perform various functions.

For example, it may be required that the flow resistance of a fluid participating in a thermo-dynamic process such as a refrigeration cycle be adjusted to a specified value. Then, a control valve will be provided in the passage conducting the respective fluid and the diaphragm will serve as the operating means of the control valve as has been hinted at above.

If, on the other hand, positive circulation is aimed at, a diaphragmed shell may be employed the passage for conducting the respective fluid of which will comprise back pressure valves upstream and downstream the diaphragm. Thereby, a diaphragm compressor or a diaphragm pump is formed according rto the fluid being a gas or vapour or else a liquid, respectively.

Obviously, both expedients may be employed simultaneously.

By means of employing diaphragms also shells suitable for performing Stirling-type refrigeration cycles are rendered feasible. In this case the shell is hermetically and possibly permanently closed and at least one of its confining plates is provided with a pair of diaphragms. The passage adjacent to the diaphragms comprises a regenerative heat-exchanger. In contrast to conventional solutions in the form of piston-type devices, the use of diaphragmed shells has the advantage that the number of strokes of the diaphragms per time unit being, ab ovo, small, their relatively large heat-transfer surfaces may come into full display. Thereby, all difficulties experienced with high speed conventional piston-type apparatus equipped with small size cylinders are successfully avoided.

For evaporation, shells may be used where their confining plates comprise each a diaphragm, upstream and downstream of which back pressure valves being provided and arranged for pairwise mutually opposite operation. Such arrangement has the advantage that, in case of a plurality of appositioned shells connected in parallel blending of fluids inside the apparatus is enhanced and, thereby, similar temperatures and concentrations in a group of shells are obtained.

BRIEF DESCRIPTION OF THE DRAWING

Hereinafter the invention will be described in greater details by taking reference to the accompanying drawing which shows, by way of example, various embodiments of the shell according to the invention and of thermo-dynamic apparatus provided with such shells, and in which.

Figure 2:
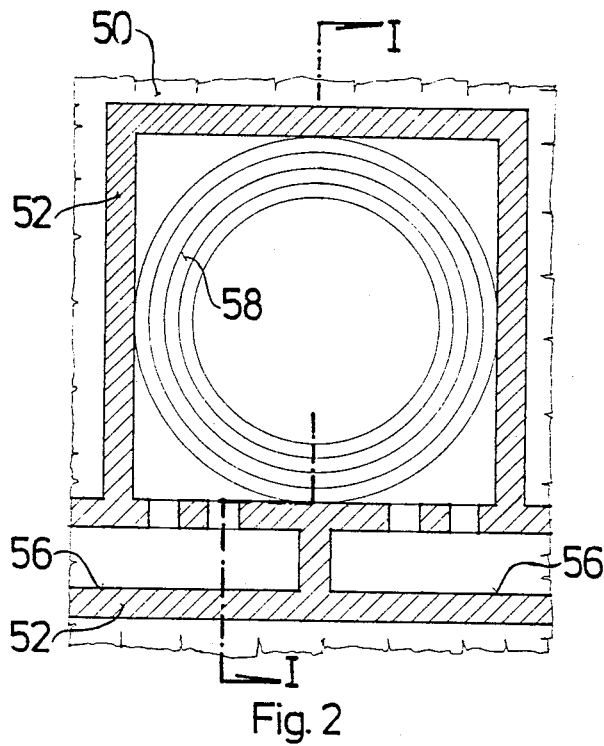
FIG. 2 is a detail of a longitudinal sectional view taken along line II—II of FIG. 1.

Same reference characters designate similar details throughout the drawing. Varieties of details of similar destination are distinguished from one another by characters complementing a respective reference numeral. Details consisting of a plurality of elements are specified by a simultaneous employment of the reference signs of such elements.

DESCRIPTION OF THE PREFERRED EMBODIMENTS

Figure 1:
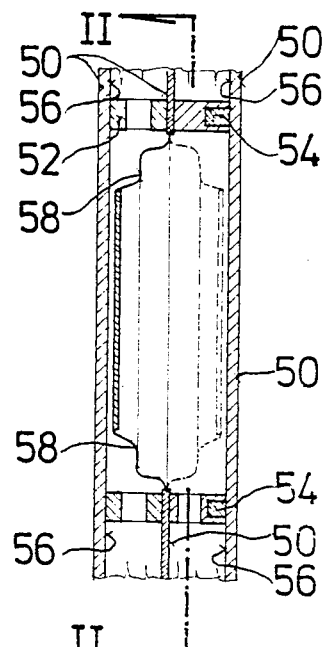
FIG. 1 illustrates a detail showing the basic features of the shell according to the invention in a cross-sectional view taken along line I—I of FIG. 2.

In the drawing FIGS. 1 and 2 show the invention limited to its key features.

As will be seen, the shell according to the invention comprises spaced confining plates 50. In the instant case, the confining plates of a shell are mutually distanced by spacers 52 which are, in a manner known per se and, therefore, not shown, connected with the confining plates 50 e.g. by means of bonding, soldering or welding, or are joined thereto by means of gaskets 54. However, instead of spacers 52 also embossments of the confining plates 50 might be employed for their spacing as described in details in the above mentioned reference. For sake of clarity, hereinafter only shells with separate spacers will be discussed.

The spacers 52 between the confining plates 50 form, in a manner likewise known per se, various passages for conducting fluids participating in a desired heat exchange based thermodynamic process. They are generally referred to by reference numeral 56.

Where both sides of the confining plates are swept by fluids, a heat transfer takes place therebetween for which purpose the confining plates are made of heat conductive material and, thus, function as heat transfer surfaces.

In compliance with the main feature of the present invention at least one of the confining plates 50, more particularly the middle confining plate 50 in FIG. 1, comprises a diaphragm 58 between the passages 56 of adjacent shells. Since the diaphragm 58 is contiguous to the passage 56 on both sides of the former, it has a double function. On the one hand, it constitutes a portion of a heat transfer surface and, therefore, permits a heat exchange between interacting fluids. On the other hand, by means of its flexibility it enables a pressure difference between such fluids to propagate from one side of the diaphragm to its other side.

Namely, when the pressure prevailing in the passage 56 of the left shell in FIG. 1 is lower than that of the fluid flowing in the right shell, the diaphragm 58 assumes the position illustrated by continuous lines in FIG. 1. In turn, when presure conditions become reversed, the diaphgram 58 moves into the position illustrated by dashed lines in the same Figure.

The embodiment of the invention as shown in FIGS. 1 and 2 is, per se, suitable to circulate the fluid flowing in the passage 56 of the left shell in alternately opposite directions the practical significance of which will be exemplified later on.

However, the diaphragm, complemented with a control valve, can be used to adjust the flow resistance in one of the passages 56, and more particularly to the throttle or, with the aid of back pressure valves, to compress or to pump a fluid flowing in such passage.

Figure 4:
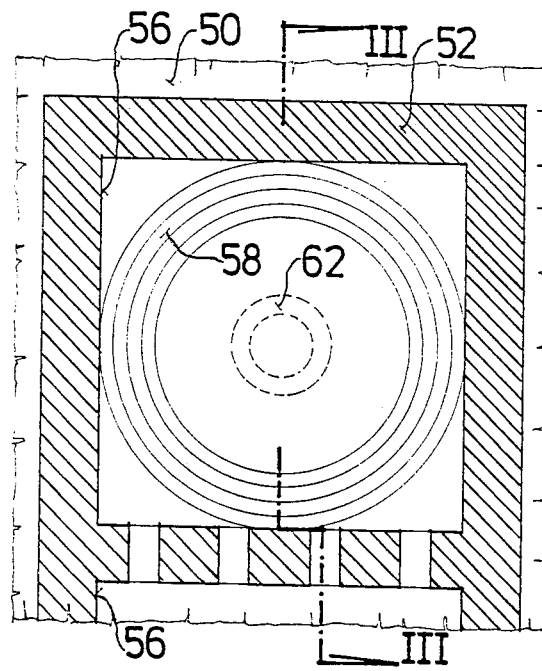
FIG. 4 shows a longitudinal sectional view taken along line IV—IV of FIG. 3.
Figure 3:
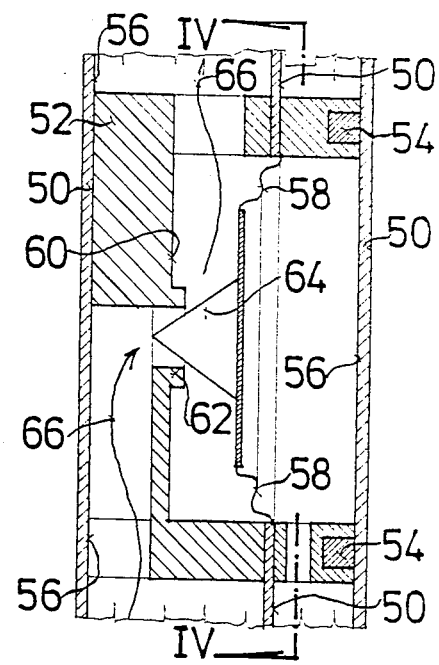
FIG. 3 represents a cross-sectional view of a control valve taken along line III—III of FIG. 4.

An exemplified embodiment of a diaphragm operated control valve is illustrated in FIGS. 3 and 4.

The spacer 52 of the left shell in the drawing forms a valve seat 62 projecting from a depression 60 in passage 56. The valve seat 62 cooperates with a valve cap 64 fixed to the front surface of a diaphragm 58. On the other side of the latter, that is in the right shell in the drawing, there is a passage 56 closed by the diaphragm 58 and destined to conduct an operating fluid such as pressure air to act on it. Thus, according to the diaphragm 58 being seen from one or the other of the adjacent shells, it either forms a terminal diaphragm closing an operating fluid conducting passage or constitutes the operating means of a control valve 58, 62, 64 consisting of the diaphragm 58 proper, the valve seat 62 and the valve cap 64.

Dependent on the pressure of the fluid conducted by the passage 56 of the right shell the diaphragm 58 will assume various axial positions and, thereby, open or close the valve seat 62 to different extents. In other words, it will adjust the flow resistance of the fluid flowing in passage 56 of the left shell in the direction indicated by arrows 66.

Figure 6:
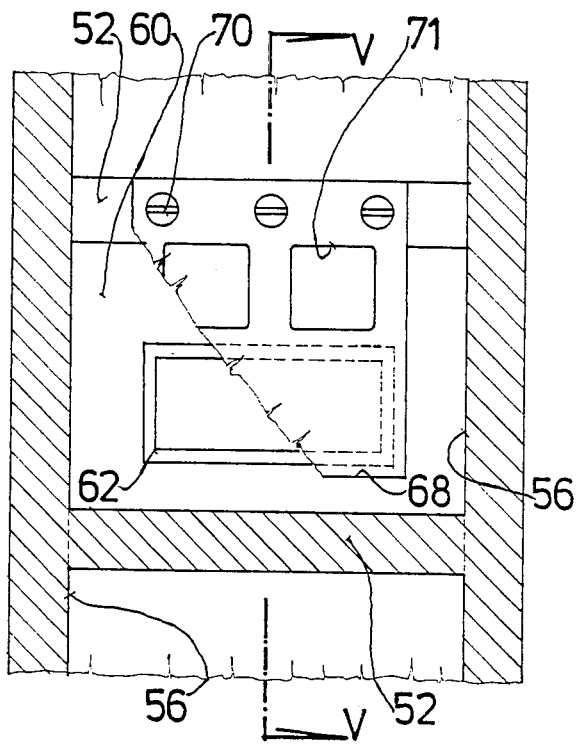
FIG. 6 represents a longitudinal sectional view taken along line VI—VI of FIG. 5.
Figure 5:
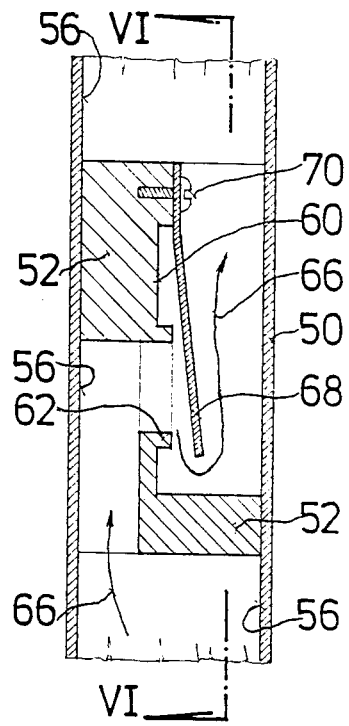
FIG. 5 illustrates a cross-sectional view of a back-pressure valve taken along line V—V of FIG. 6.

FIGS. 5 and 6 show an exemplified embodiment of back pressure valves.

The spacer 52 forms a valve seat 62 in the passage 56 as in the previous case. The valve seat 62 cooperates with a diaphragm plate 68 which functions as valve disc and which is fixed to the spacer 52 by means of screws 70. A depression 60 in the spacer 52 beneath the diaphragm plate 68 permits a uniform spreading out of fluid along the whole circumference of the valve seat 62 upon opening of the diaphragm plate 68. To enhance unimpeded flowing out the diaphragm plate 68 is provided with rectangular orifices 71.

When the pressure of a fluid flowing in the passage 56 in the direction of arrows 66 overwhelms the springing force of diaphragm plate 68, the latter rises to the position shown in the drawing and opens the passage 56 via the valve seat 62. On the other hand, when the pressure of the fluid flowing in the passage 56 sinks below the springing force of diaphragm plate 68, the latter will settle down on the valve seat 62 and, thereby, interrupt the flow in the passage 56 and, at the same time, prevent a back flow of fluid therein. Thus, valve seat 62 and diaphragm plate 68 constitute a back pressure valve 62, 68.

Obviously, instead of a springing diaphragm plate other means such as globe valves might be employed as well. However, the valve shown in FIGS. 5 and 6 is, due to its flat shape, particularly suitable for being employed in shells according to the present invention themselves composed of essentially flat component parts.

It will be shown hereinafter how shells according to the present invention can be composed so as to form various apparatus to carry out thermo-dynamic processes based on heat exchange between fluids flowing in the passages of the shells.

FIGS. 7 to 12 illustrate an exemplified shelled apparatus for performing a conventional refrigeration cycle.

Figure 7:
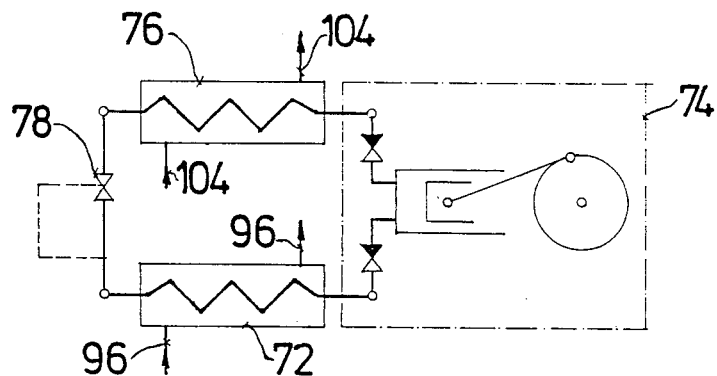
FIG. 7 is a connection diagram showing the working principle of a refrigeration cycle.

The working principle of the apparatus is symbolized in FIG. 7.

The working fluid of the cycle such as ammonia ($NH_3$) is circulated in a closed system the main parts of which are an evaporating heat exchanger 72, a compressor 74, a condenser 76 and an expansion valve 78 connected in series. The expansion valve 78 is controlled by the pressure prevailing in the evaporation heat exchanger 72 as suggested by dotted lines connecting the expansion valve 78 with a spot of the series connection downstream thereof.

In operation, the evaporating heat exchanger 72 is traversed by a heat-carrying fluid such as brine by which the circulating working fluid is evaporated at low temperature. Resulting vapours are conveyed by the compressor 74 into the condenser 76 of relatively higher pressure which is traversed by a cooling fluid. The latter causes the vapours to condense and go over into their liquid state. The pressure of the liquid flowing through the expansion valve 78 is reduced by throttling again to the value of pressure prevailing in the evaporating heat exchanger 72. Therewith, the cycle starts anew. The cooling output is carried away by the heat-carrying fluid traversing the evaporating heat exchanger, e.g. by the above mentioned brine.

Figure 8:
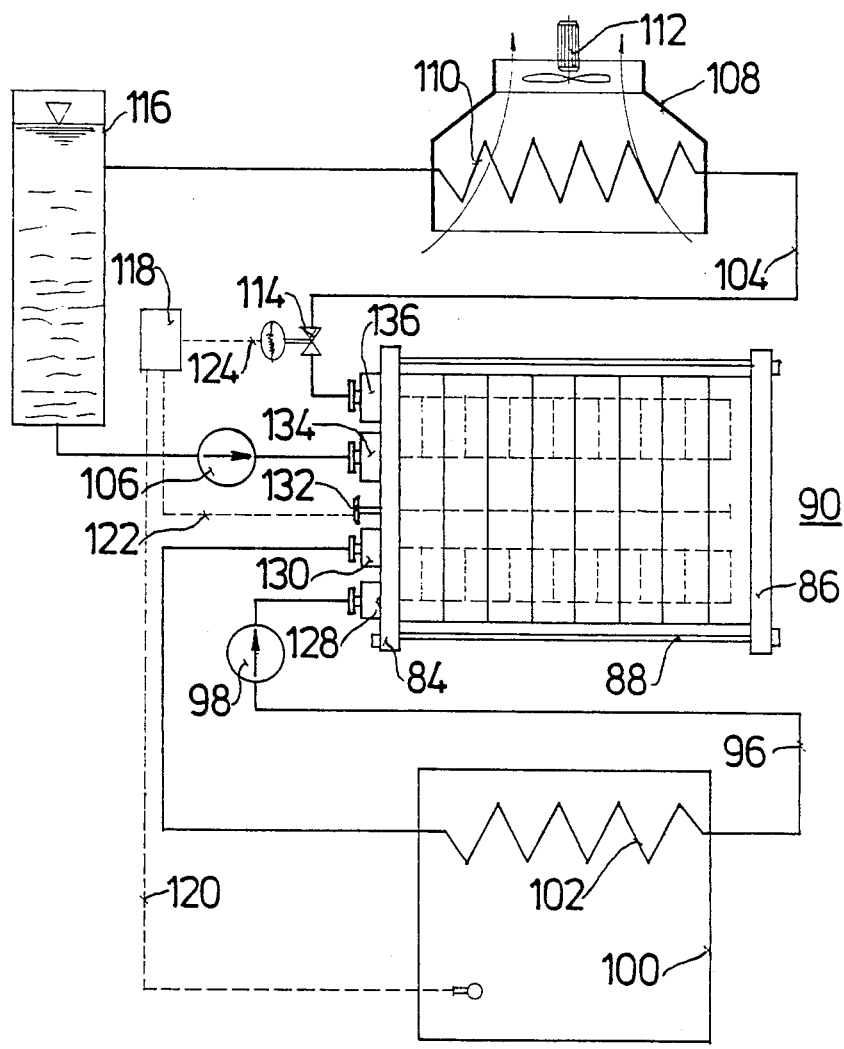
FIG. 8 illustrates a connection diagram of an apparatus with shells according to the invention for performing a refrigeration cycle as shown in FIG. 7.

A connection diagram of a shelled apparatus performing such refrigeration cycle is, by way of example, shown in FIG. 8.

The conceptual connection represented in FIG. 7 is realized in shells according to the invention which are pairwise located between frames 84 and 86 and united by means of bolts 88 to a central unit 90. Of these only two are illustrated in the drawing in order to avoid obscuring and unimportant details.

Figure 9:
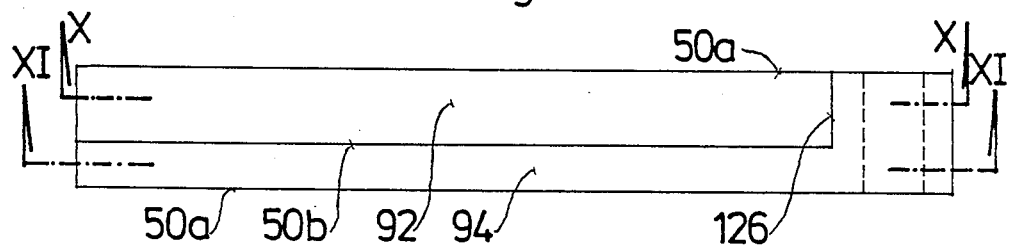
FIG. 9 represents a lateral view of a pair of shells according to the invention comprised by the apparatus illustrated in FIG. 8.

The members of a pair of shells are referred to by reference numerals 92 and 94, respectively, as best seen in FIG. 9.

The above mentioned heat-carrying fluid (brine) traversing the evaporating heat exchanger 72 (FIG. 7) is circulated in a conduit 96 by a pump 98. The conduit 96 is led through a chamber 100 where the cooling output is extracted by means of a heat exchanger 102 whereby the heat-carrying fluid is warmed up.

In another conduit 104 the above mentioned cooling fluid for the condenser 76 (FIG. 7) is circulated by a pump 106. Its heat is extracted in a heat exchanger 110 located in a funnel 108 which is traversed by air conveyed by a fan 112 likewise placed in the funnel 106. Thus, funnel 108, heat exchanger 110 and fan 112 constitute an air cooler 108, 110, 112.

The conduit 104 comprises a control valve 114 by which the pressure of the cooling fluid is periodically changed. As will be seen, this is necessary to operate the compressors 74 within the shells. In contrast, the delivery of pump 106 is of uniform rate. The result is a pulsating flow of the cooling fluid in conduit 104. Such pulsation is attenuated by a balance tank 116 in conduit 104.

The expansion valve 78 in the series connection traversed by the working fluid and the control valve 114 in conduit 104 traversed by the cooling fluid have to be adjusted dependent on a desired cooling output that is on the temperature prevailing in chamber 100. Such adjustment is effected by a hydraulic control unit 118 having a temperature feeling inlet 120 connected to chamber 100, and two control outlets 122 and 124 connected to the central unit 90 and to the control valve 114, respectively.

Details of the shells constituting the central unit 90 are illustrated in FIGS. 9 to 12.

FIG. 9 shows a pair of shells 92 and 94. Of these, shell 94 is formed in the shape of an L. Shell 92 is embraced by the legs of the L-shaped shell 94 and is hermetically and, in the instant case, permanently closed in that its confining plates 50a and 50b are airtightly connected to one another by a web plate 126 e.g. by means of welding.

Figure 10:
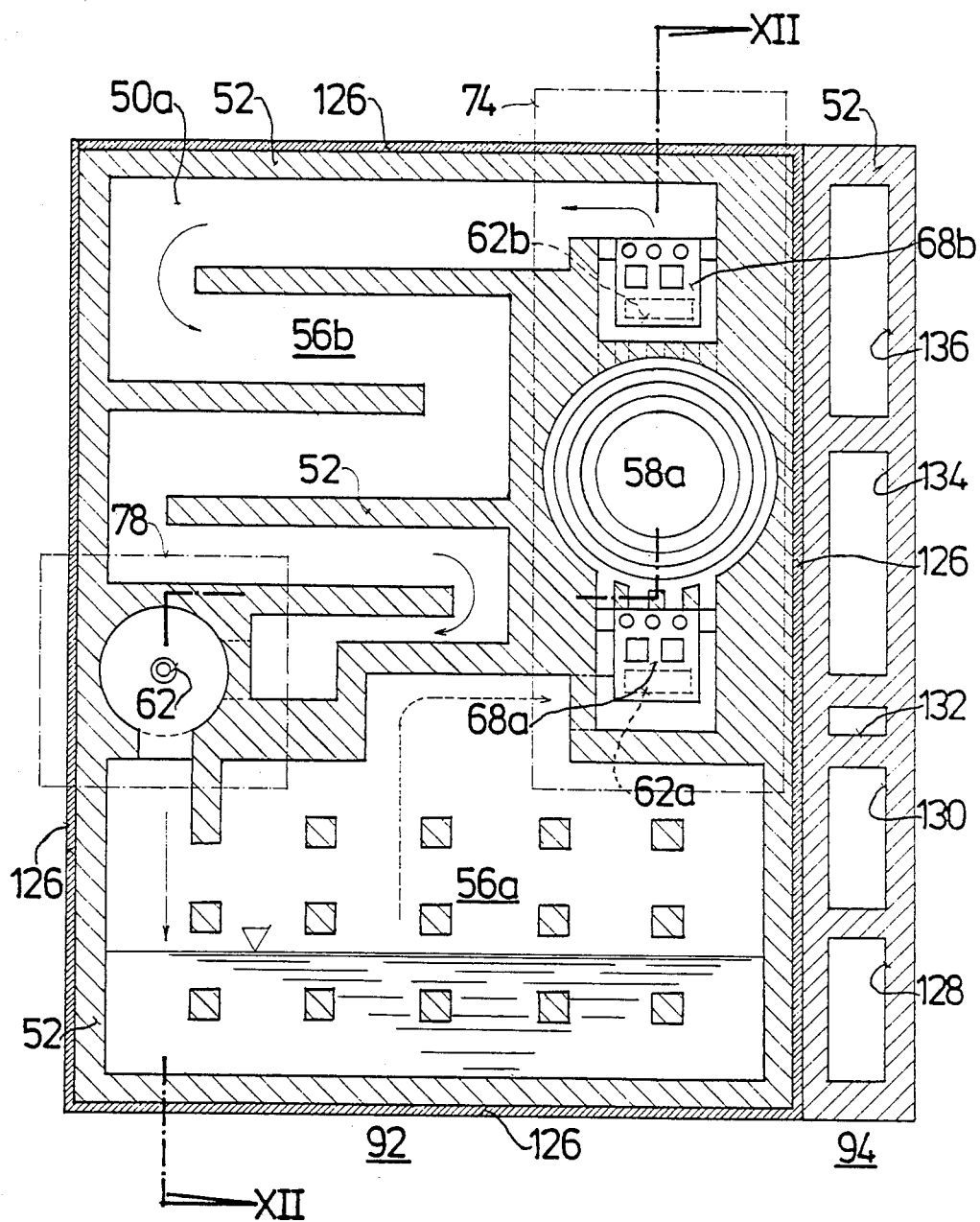
FIG. 10 is a longitudinal sectional view taken along line X—X of FIG. 9.

Details of the interior of hermetically closed shell 92 are shown in FIG. 10. It will be seen that its spacer 52 defines a lower passage 56a and an upper passage 56b therein which are connected with each other through a pair of diaphragm structures One of these diaphragm structures shown at the right of FIG. 10 is constructed essentially as illustrated in FIGS. 1 and 2. Upstream and downstream its diaphragm 58a back pressure valves 62a, 68a and 62b, and 68b, respectively, are provided which are similar to the back pressure valve 62, 68 illustrated in FIGS. 5 and 6.

The other one of the diaphragm structures shown at the left of FIG. 10 is essentially the same as has been described in connection with FIGS. 3 and 4. In FIG. 10 only the valve seat 62 is visible.

Prior to being hermetically closed, shell 92 is provided with a filling consisting of the work medium or working fluid of the refrigeration cycle such as the above mentioned ammonia.

The shorter leg of the L-shaped shell 94, an elevational and a sectional view of which are shown in FIGS. 9 and 10, respectively, comprises cavities which are portions of channels 128, 130, 132, 134 and 136 extending throughout the central unit 90 shown in FIG. 8. Therefore, the cavities bear the reference numerals of the respective channels.

Figures 11, 12:
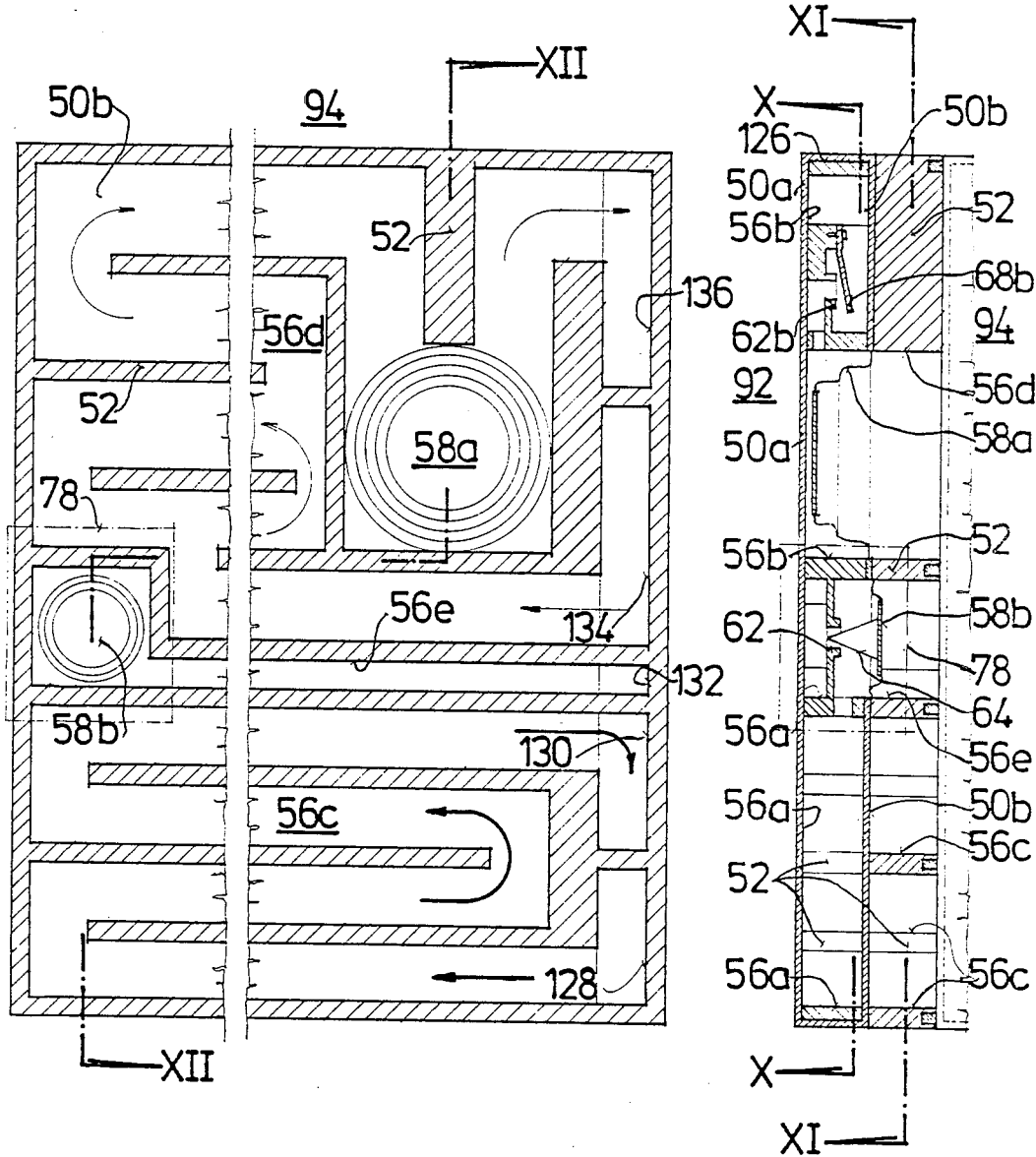
FIG. 11 shows a longitudinal sectional view taken along line XI—XI of FIG. 9.
FIG. 12 illustrates a cross-sectional view taken along line XII—XII of FIG. 10.

Details of the inner structure of the longer leg of the L-shaped shell 94 go forth from FIG. 11. It will be apparent that, here, the spacer 52 defines a lower passage 56c and an upper passage 56d separated from one another and connected to the channels 128 and 130 as well as 134 and 136, respectively. They are, through confining plate 50b between shells 92 and 94, adjacent to and registering with passages 56a and 56b, respectively, of shell 92. A further passage 56e is connected with channel 152 and leads above a terminal diaphragm 58b provided in the confining plate 50b.

Mutual arrangements of the passages of shells 92 and 94 is partly shown by the cross-sectional view illustrated in FIG. 12.

As is apparent from the drawing, diaphragm 58a as part of heat-conductive confining plate 50b is adjacent to passage 56d, and, thus, may function as heat-transfer surface as well. On the other hand, diaphragm 58b though likewise part of confining plate 50b has but pressure transmitting function since it terminates passage 56e which is destined to conduct a pressure fluid as mentioned in connection with FIGS. 3 and 4.

Furthermore, a comparison of FIGS. 9, 10 and 11 shows that shells 92 represent closed systems by themselves whilst passages 56c and 56d of shells 94 are connected in parallel between channels 128, 130 and 134, 136 and, thus, are collectively connected to conduits 96 and 104, respectively. Essentially, the same applies to passages 56e which all branch off from channel 132.

In operation, conduit 96 (FIG. 8) conveys the heat-carrying fluid which receives its heat in chamber 100 by means of heat exchanger 102.

The warmed up heat-carrying fluid is caused by pump 98 to traverse channel 128 and parallelly connected passages 56c of shells 94 (FIG. 11, thick arrows) whereafter it is returned via channel 130 and conduit 96 into heat exchanger 102.

Meanwhile the heat-carrying fluid cools down because its heat is transmitted through confining plates 50a and 50b to the work medium or working fluid circulating in closed system within shells 92.

The cooled down heat-carrying fluid is anew warmed up in heat exchanger 102 which means that chamber 100 is cooled by heat extraction (cooling output).

The working fluid flowing in passages 56a of shells 92 is evaporated by the heat of the heat-carrying fluid flowing in passages 56c of shells 94 (FIG. 10, dashed arrows). Thus, passages 56a and 56c as well as confining plates 50a and 50b represent the evaporating heat exchanger 72 shown in FIG. 7.

Vapours resulting from evaporation are conveyed by diaphragm compressor 74, consisting of elements 58a, 62a, 68a, 62b and 68b, at a relatively higher pressure, into passages 56b of shell 92 where they become condensed due to the cooling effect of the cooling fluid flowing in passages 56d of shell 94 (FIG. 10, continuous arrows). Thus, passage 56b and confining plates 50a and 50b represent the condenser 76 shown in FIG. 7.

The diaphragm compressor 74 is operated by pressure changes of the cooling fluid flowing in passages 56d of shells 94 (FIG. 11, continuous thin arrows). This is the significance of the diaphragm 58a being part of a heat-transfer surface since, thereby, in addition to heat exchange also pressure exchanges are taking place without the need of a separate operating fluid being employed for such purpose.

The condensate of vapours condensed in passages 56b of shells 92 (FIG. 10, continuous arrows) traverses the control valves 78 consisting of elements 58b, 62, 64 and, by means of throttling, assumes the relatively lower pressure prevailing in passages 56a and becomes anew evaporated while it extracts heat from the heat-carrying fluid flowing in passages 56c of shells 94 (cooling output).

The cooling fluid is delivered by pump 106 from balance tank 116 into channel 134 (FIG. 8) and from here into passages 56d of shells 94 (FIG. 11) where it exerts its condensing effect across confining plates 50a and 50b on the working fluid flowing in passages 56a of shells 92 (FIG. 10).

The warmed up cooling fluid traverses the control valve 114 and flows through the air cooler 108, 110, 112 where its heat is carried away into the ambiancy. Thereafter, the cooled down cooling fluid is reentered into balance tank 116 (FIG. 8).

The hydraulic control unit 118 (FIG. 8) has a series of functions.

On the one hand, it feels through its feeler inlet 120 the temperature present in chamber 100 that is the value of cooling output.

On the other hand, it adjusts through its control outlet 122 and the passages 56e of shells 94 the expansion valves 78 dependent on the felt value of cooling output.

Furthermore, likewise dependent on the felt cooling output it adjusts through its control outlet 124 the control valve 114 in conduit 104 of the cooling fluid.

Thus, dependent on the cooling output, control unit 118 influences the flow resistances of both the working fluid flowing in closed systems within shells 92, and of the cooling fluid flowing through shells 94 in parallel connection.

At a cooling output higher than desired the hydraulic control unit 118 initiates a throttling by means of expansion valves 78 and the control valve 114. Thus, it interferes with the flow resistances of both the working fluid circulating in each of shells 92 in closed systems and the cooling fluid flowing through shells 94 in parallel connection.

On the other hand, if the cooling output sinks below a desired value, the hydraulic control unit 118 causes the valves 78 and 114 to open with the effect of a more vigorous flow of both the working fluid and the cooling fluid. The result will be an increase of the cooling output.

The design of the hydraulic control unit 118 represents a conventional task in the field of hydraulic controls and does not need further explanations. The more so since it is not claimed as part of the present invention.

Figure 13:
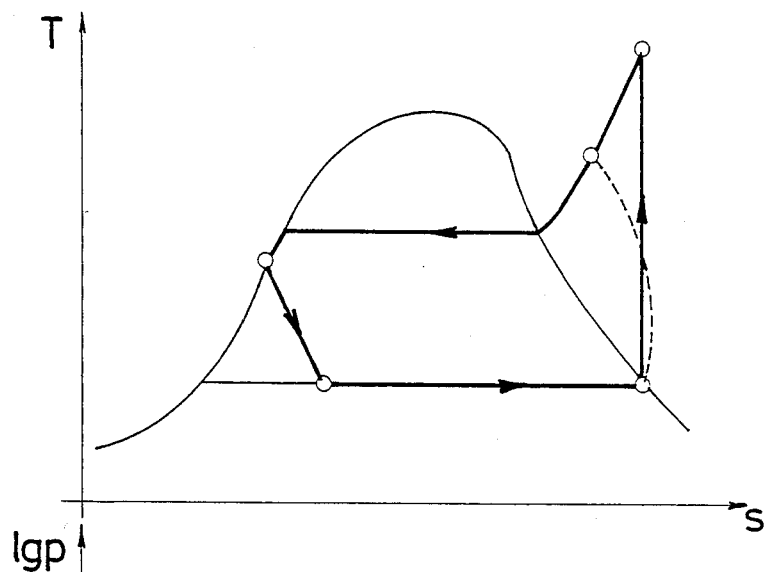
FIG. 13 represents the diagram of a conventional refrigeration cycle.
Figure 14:
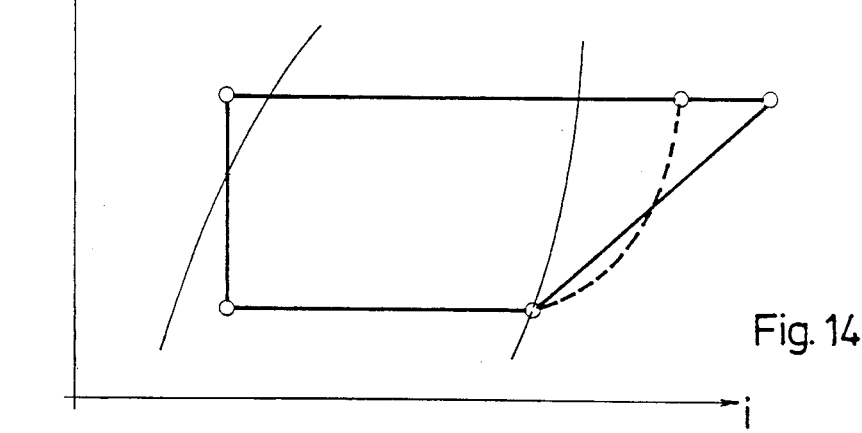
FIG. 14 is a diagram showing the same cycle in function of further parameters.

Diagrams characteristic of the course of the above described refrigeration cycle are shown in FIGS. 13 and 14 which also permit to point out the advantages obtainable by the use of shells according to the present invention in shelled apparatus for carrying out conventional refrigeration cycles.

FIG. 13 shows changes of temperature T prevailing in chamber 100 in function of entropy s.

FIG. 14 illustrates the course of the refrigeration cycle, in compliance with the terminology used in the art, as a relation between the logarithm of pressure (lgp) and entalpy (i).

In both diagrams thin lines represent relations of parameters independent of the refrigeration cycle.

If compression in compressor 74 (FIG. 7) is supposed to be free of losses, refrigeration parameters take the course represented by continuous thick lines in the diagrams. If, however, the central unit 90 (FIG. 8) is composed of shells 92 and 94 according to the present invention, compression is brought about with simultaneous heat extraction since diaphragms 58a (FIGS. 11 and 12) responsible for compression constitute heat transfer surfaces as well. Therefore, actually, compression will take the course shown by dashed lines in FIGS. 13 and 14. It means that, due to a decrease in required compression work, also the area characteristic of the demand of work of the refrigeration cycle is diminished.

The apparatus shown in FIG. 8 will considerably be simplified if high pressure running water is used for cooling purposes the pressure of which can, in addition to its cooling action, be exploited as well. Then, pump 106, air cooler 108, 110, 112 and balance tank 116 can obviously be dispensed with since the task of cooling is taken over by the running water. Only its pressure has to be adjusted which is, in turn, still performed by control valve 114 adjusted by hydraulic control unit 118. The warmed up cooling water is discharged into a drain.

The diaphragm compressor 74 can, instead of by the cooling fluid, be operated by the heat-carrying fluid or by a pressure liquid expressly employed for such purpose.

In the former case the diaphragm compressor 74 will lie in the passage 56a of shells 92 and the control valve 114 will be comprised by conduit 96.

On the other hand, if a separate pressure fluid is employed, the diaphragm 58a works in the manner of a terminal diaphragm similar to diaphragm 58b and closes a further passage similar to passage 56e.

Accordingly, the control outlet 124 of control unit 118 is connected either to control valve 114 now in conduit 96 or to the above mentioned further passage in the manner of control outlet 122.

The size of the balance tank 116 can be minimized if a pair of central units 90 connected in parallel for mutually opposite operations are employed since, then, pulsations of fluids flowing in a pair of conduits corresponding to conduit 104 are partly suppressed.

In case of moderate requirements fixed throttles may be substituted for the expansion valves 78 by which, on the one hand, lower capital costs will be needed and, on the other hand, possibilities of breakdowns will be restricted.

The diaphragm compressor 74 (FIG. 10) broadly as disclosed might be employed as a diaphragm pump as well for performing e.g. a sorption-type refrigeration cycle. It will, then, be used for circulating the working fluid in its liquid state likewise in a closed system.

In order to illustrate a further advantageous employment of the shells according to the invention FIGS. 15 to 22 show an apparatus which is suitable to carry out a Stirling-type refrigeration cycle.

Stirling-type refrigeration cycles are carried out by means of gases such as hydrogen or helium which, in the operational temperature range, behave as an ideal gas.

Figure 15:
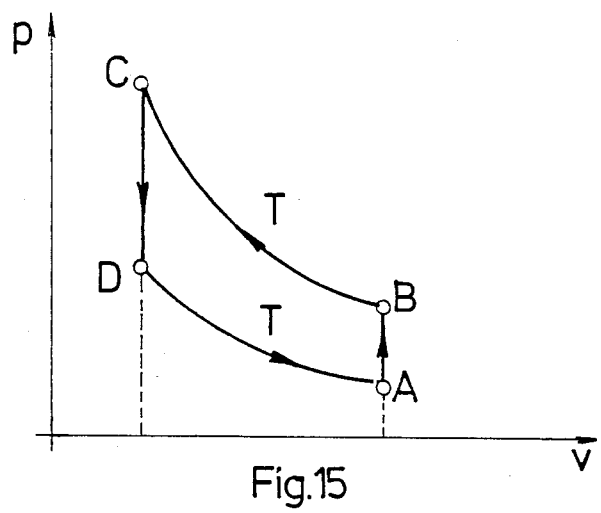
FIG. 15 illustrates the diagram of a Stirling-type refrigeration cycle.

FIG. 15 shows the pv (pressure-specific volume) diagram of a Stirling-type refrigeration cycle. As will be seen, the cycle consists of isothermal compression and expansion B-C and D-A each between a pair of isochor pressure increase and decrease A-B and C-D, respectively.

Figure 16:
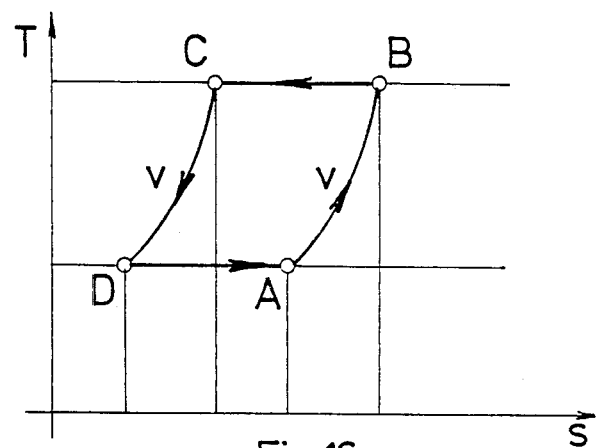
FIG. 16 shows a diagram illustrating the same cycle in function of further parameters.

In FIG. 16 temperature T of the working fluid is plotted against its entropy s showing respective changes of state A-B, B-C, C-D and D-A.

Figure 17:
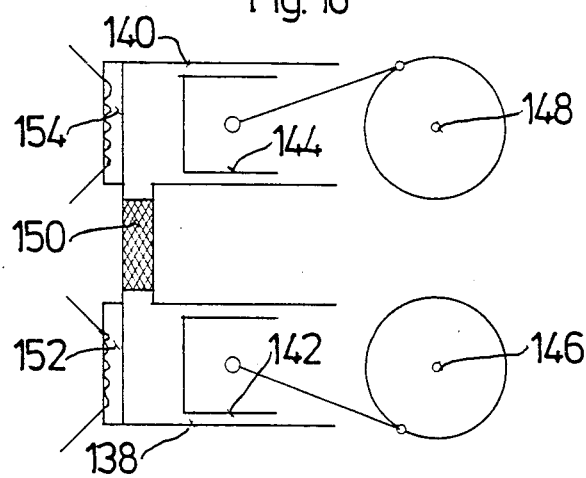
FIG. 17 represents the connection diagram of a refrigerator working on the Stirling-type refrigeration principle.

The technical principle of realizing a Stirling-type refrigeration cycle goes forth from the connection diagram shown in FIG. 17.

A pair of cylinders 138 and 140 comprise each a piston 142 and 144 which are positively driven by shafts 146 and 148, respectively. The chambers of the cylinders 138 and 140 are connected with each other through a regenerative heat exchanger 150.

When, due to an increase or decrease of pressure, a working fluid flows from one cylinder chamber into the other one it traverses the regenerative heat exchanger. Thereby, it either cools down by warming up the regenerative heat exchanger or else it becomes warmed up by the regenerative heat exchanger being cooled down. This ensures that during its isochor changes of state the working fluid is warmed up and cooled down in accordance with curve sections A-B and C-D, respectively, of the diagrams.

Furthermore, the cylinders 138 and 140 constitute heat-transfer surfaces which is indicated by heat exchangers 152 and 154 responsible for the isothermal nature of curve sections B-C and D-A, respectively.

By taking reference also to the diagrams shown in FIGS. 15 and 16 a Stirling-type refrigeration cycle can be described as follows:

Be assumed that, due to mutual positions of pistons 142 and 144, the working fluid occupies the chamber of cylinder 138 and its pressure is of minimum value p (point A). Now, piston movements cause the working fluid to flow over into cylinder 140 at constant volume. However, by traversing regenerative heat exchanger 150 the working fluid picks up heat therefrom and, thereby its pressure increases (curve section A-B).

By the end (point B) of such isochor change of state the working fluid, now in cylinder 140, is compressed at a rate which corresponds to the rate of heat extraction by heat exchanger 154 so that the temperature of the working fluid does not change during compression which ensures the isothermal nature of the latter (curve section B-C).

At the end of compression (point C) mutual movements of pistons 142 and 144 cause the working fluid to return into cylinder 138. While traversing the regenerative heat exchanger 150 the working fluid delivers its heat at unchanged volume (isochor cooling down) so that its pressure and temperature decreases as shown in FIGS. 15 and 16, respectively (curve section C-D).

Such isochor cooling down having been terminated (point D) the working fluid in cylinder 138 is isothermally expanded (curve section D-A) which is due, on the one hand, to further movements of piston 142 and, on the other hand, to heat transmitted into the working fluid by heat exchanger 152.

Hereby, the Stirling-type refrigeration cycle is closed and is repeated in the above described manner, respectively.

The cooling output is delivered by heat exchanger 152.

Figure 18:
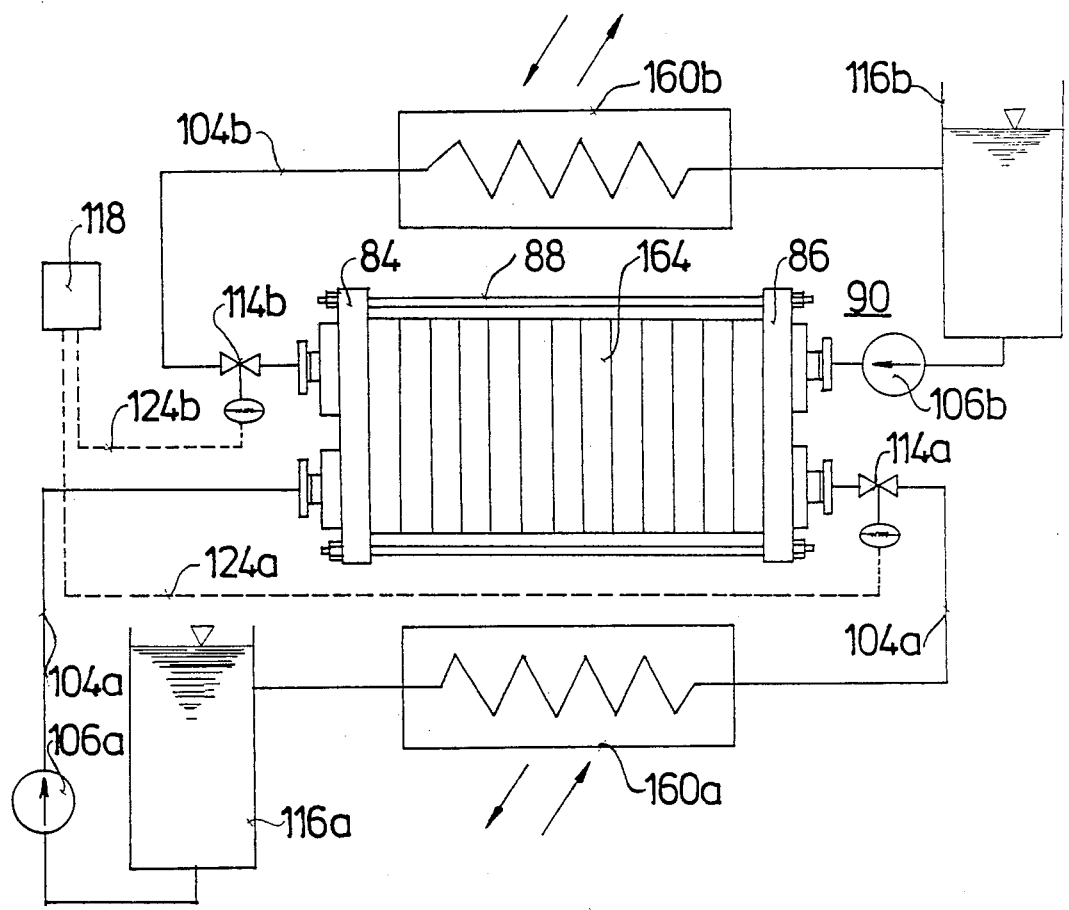
FIG. 18 is the connection diagram of an apparatus performing a Stirling-type refrigeration process by means of shells according to the invention.

A connection diagram of an exemplified Stirling-type refrigerator composed of shells according to the present invention is illustrated in FIG. 18.

As implied by reference numerals, a Stirling-type refrigerator is, partly, built up of the same component parts as the apparatus shown in FIG. 8 for carrying out a conventional refrigeration cycle. Exceptions are two heat exchangers 160a and 160b which are of identic designs and are arranged for both extracting and introducing heat the significance of which will be explained hereinafter.

A central unit 90 is composed of pairwise employed shells 162 and 164 shown in FIGS. 19 to 22.

Figures 19, 20:
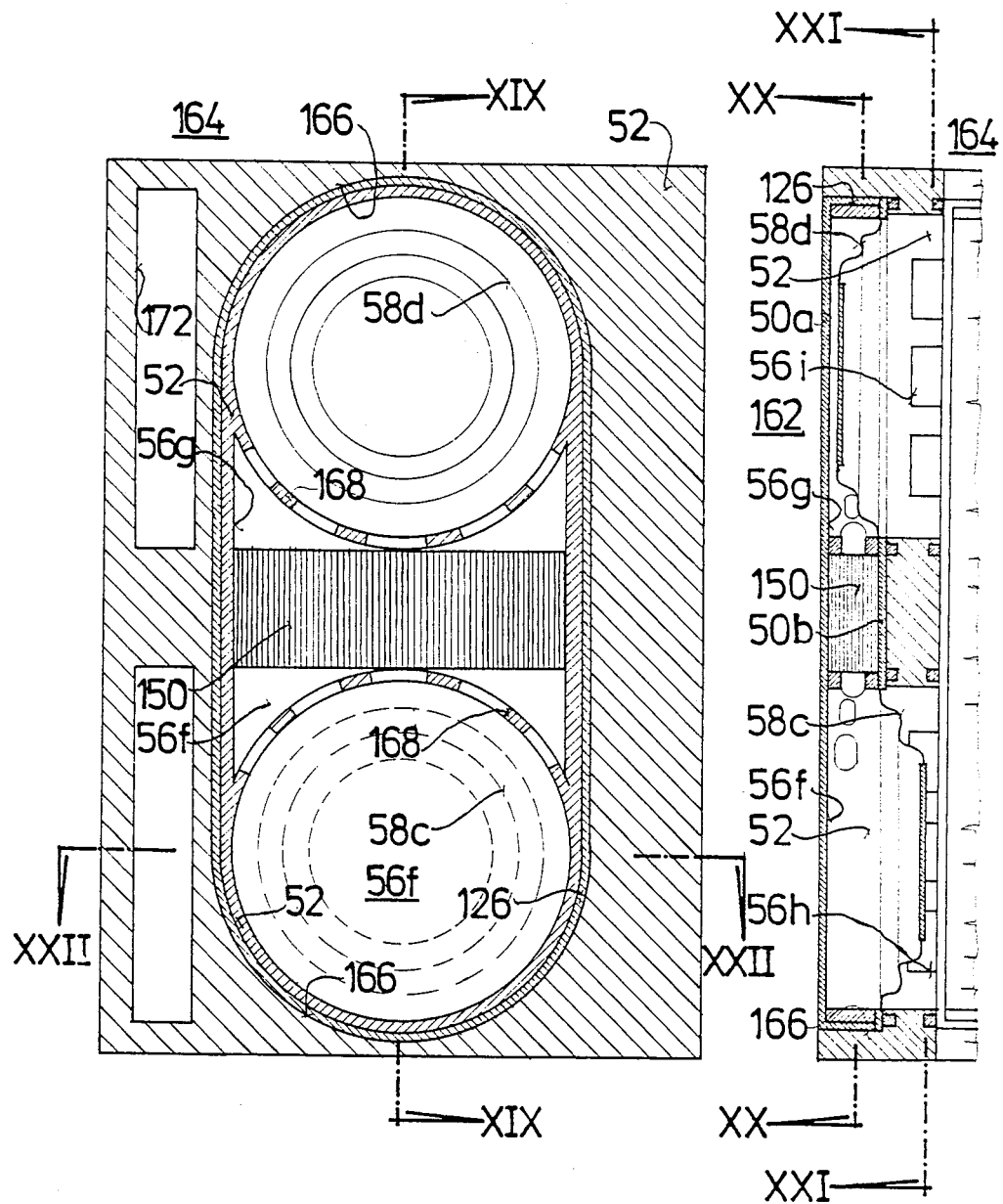
FIG. 19 shows a cross-sectional view of a pair of shells employed in the apparatus according to FIG. 18 taken along lines XIX—XIX of FIGS. 20 and 21.
FIG. 20 illustrates a longitudinal sectional view taken along line XX—XX of FIG. 19.

Cross-sectional and longitudinal sectional views of such pairs are illustrated in FIGS. 19 and 20, respectively.

Hermetically closed shell 162 containing a working fluid is located in a recess 166 of shell 164 which, in turn, conducts a heat-carrying fluid and a cooling fluid. Actually, shell 164 encompasses shell 162 along a web plate 126 of the latter.

Confining plate 50b of shell 162 comprises a pair of edgewise superposed diaphragms 58c and 58d which confine passages 56f and 56g, respectively, in shell 162. Between both passages 56f and 56g there is provided the regenerative heat exchanger 150 mentioned in connection with FIG. 17.

Curved sections of spacer 52 of shell 162 encircling the diaphragms and facing the regenerative heat exchanger 150 comprise orifices 168 through which passages 56f and 56g open into the latter.

Figure 21:
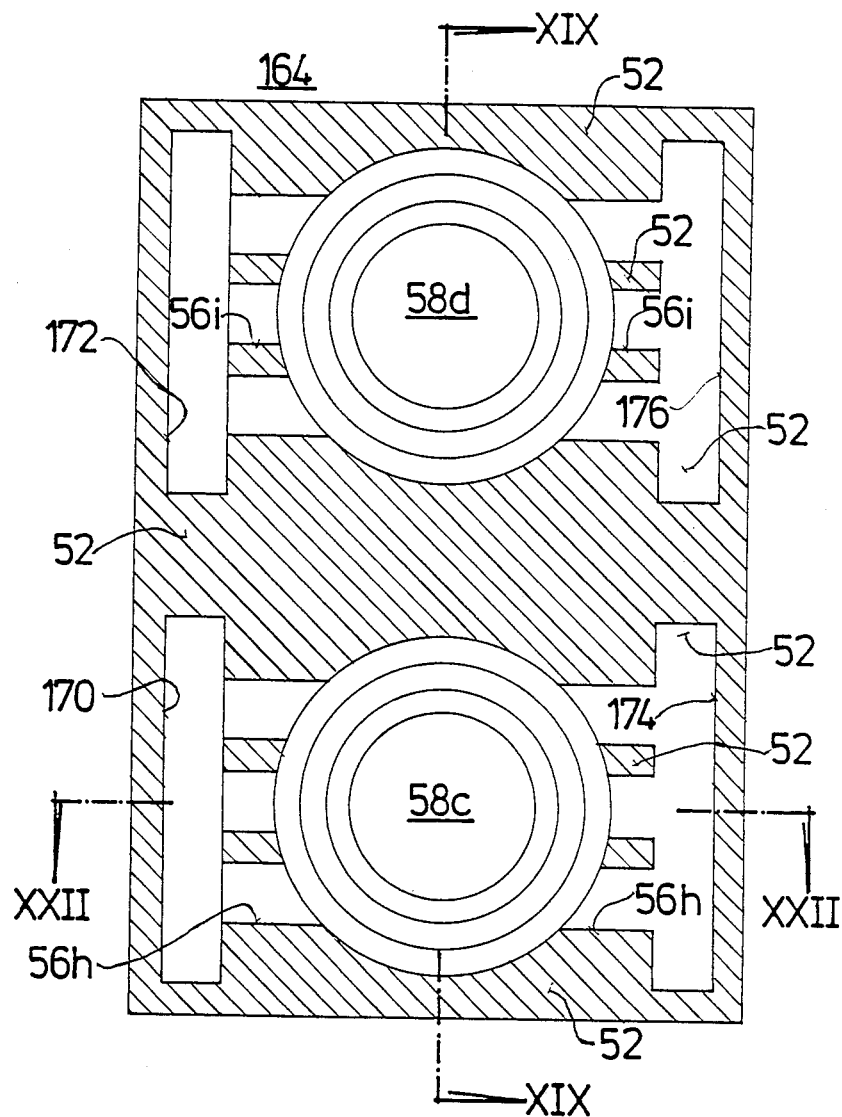
FIG. 21 shows a longitudinal sectional view taken along line XXI—XXI of FIG. 19.

As shown in FIG. 21, the spacer 52 of shell 164 comprises a pair of through channels 170 and 172 on one side of the diaphragms 58c and 58d whilst on the other side thereof a pair of blind channels 174 and 176, respectively, are provided. Through channel 170 is connected with blind channel 174 via passages 56h while through channel 172 is connected with blind channel 176 via passages 56i.

Figure 22:
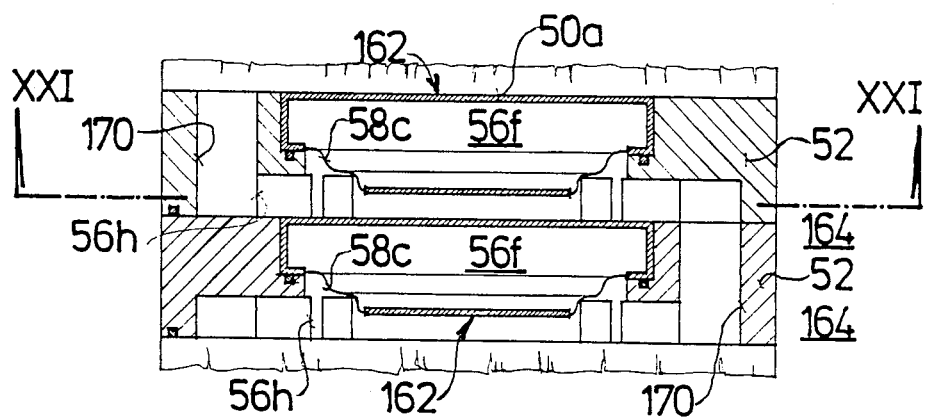
FIG. 22 is a cross-sectional view taken along lines XXII—XXII of FIGS. 20 and 21.

It will be apparent from FIG. 22 that adjacent shells 164 in central unit 90 occupy angular positions mutually displaced by 180 degrees. Consequently, the shells are connected in series as regards the flow of both the heat-carrying fluid and the cooling fluid. The significance of such expedient consists in that, dependent on the temperature ranges of the heat-carrying fluid and the cooling fluid various refrigeration cycles will take place by which the all over efficiency of the apparatus may favourably be increased.

On basis of FIG. 22 it will also be apparent that in FIG. 21 the bottom of blind channels 174 and 176 appear as surface areas of spacer 52.

In operation, the heat-carrying fluid is circulated by pump 106a through the series connection of channels 170 and 174 of shells 164. Its heat and pressure are transmitted through and by diaphragms 58c of shells 162 to the working fluid in passages 56f.

At the same time, channels 172 and 176 are traversed by the cooling fluid under the action of pump 106b. Thus, by means of diaphragms 58d the temperature and pressure prevailing in conduit 104b will be transmitted to passages 56g of shells 162.

Pressures prevailing in conduits 104a and 104b for the heat-carrying fluid and the cooling fluid are controlled by means of control valves 114a and 114b, respectively, in accordance with the piston movements described in connection with FIG. 17. Thus, diaphragms 58c and 58d are deflected in the same manner as pistons 142 and 144. However, the time periods and intervals of diaphragm deflections are defined by control unit 118:

In the position of diaphragms 58c and 58d shown in FIG. 19 the pressure of the working fluid in passage 56f is of minimum value (point A).

The diaphragms are now deflected so as to cause the working fluid to flow over from passage 56f into passage 56g without volume change. Therewhile, the working fluid picks up heat in regenerative heat exchanger 150 so that its pressure increases at constant volume (isochor change of state, curve section A-B).

At the end (point B) of isochor pressure increase the working fluid is compressed by diaphragm 58d at constant temperature since its compression heat is extracted therefrom by cooling through confining plate 50a and diaphragm 58d (isothermal compression, curve section B-C).

Upon termination (point C) of isothermal compression deflections of diaphragms 58c and 58d cause the working fluid to flow back into passage 56f at constant volume. By traversing regenerative heat exchanger 150 it cools down and its pressure decreases (isochor change of state, curve section C-D).

When such isochor pressure drop reaches its end (point D), diaphragm 58c is further deflected while the working fluid, due to heat received through confining plate 50a and diaphragm 58c, is expanded at constant temperature (isothermal expansion, curve section D-A).

Now, the above described cycle starts again.

The cooling output is delivered by heat exchanger 160a which corresponds to heat exchanger 152 shown in FIG. 17.

As will be seen, the basic advantage of a Stirling-type refrigerator composed of shells according to the present invention consists in that—in contrast to conventional high speed piston machines—heat is transmitted and extracted by diaphragms moved according to predetermined programs and possibly at low speeds the heat transfer surfaces of which being, at the same time, relatively large. Thus, slowness of heat transmission is counter-balanced by the largeness of the heat transfer surfaces, again in contrast to piston machines where heat transmission has to take place through small size cylinder surfaces at relatively high speeds. Consequently, compression and expansion will come closer to isothermal characteristics and, thereby, to a theoretically obtainable maximum value of efficiency. Actually, a practical realization of Stirling-type refrigeration cycles is first rendered possible by the present invention which provides means suitable to put into practice a hitherto but theoretical possibility.

A further advantage exists in that by a switching over of the control unit 118 the flow direction of heat can be reversed and, thereby, refrigeration can be changed to heat pumping. This is rendered possible by the symmetrical layout of the apparatus as shown in the drawing and referred to above where the identity of design of heat exchangers 160a and 160b has been pointed out. Such going over from refrigeration to heat pumping means that heat is introduced into rather than extracted from the system. The change of operation is suggested by arrows of opposite directions at heat exchangers 160a and 160b in FIG. 18. A corresponding design of a reversible control unit 118 lies within the field of designing hydraulic control systems where it constitutes a routine activity. Thus, a description of structural details may be dispensed with here.

A possibility of switching over has its significance in the domain of air-conditioning where, in addition to cooling in summer, also heating in winter by means of heat pumping might be required as well.

The Stirling-type refrigeration process described above may be carried out also with shells 162 both confining plates 50a and 50b of which comprise diaphragms. Thereby, deflections of the diaphragms may be decreased and their life periods correspondingly increased.

The balance tanks 116a and 116b may be dispensed with here as well if a plurality of control units 90 are employed in parallel connection which are, e.g. by means of control unit 118, controlled in accordance with one another. Then, flow pulsations in various conduits 104a and 104b will mutually be extinguished.

FIGS. 23 to 28 show an exemplified evaporator realized with the employment of shells according to the invention.

Figure 23:
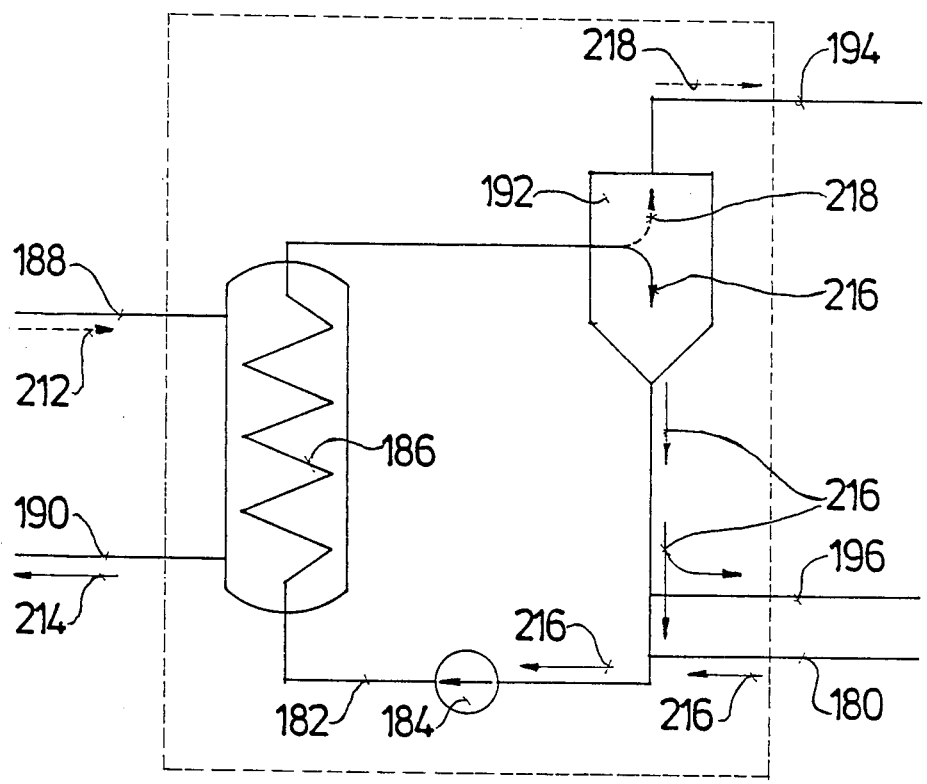
FIG. 23 illustrates a connection diagram of an evaporator.

The essence of an evaporation process goes forth from the connection diagram illustrated in FIG. 23:

A feed fluid to be evaporated (e.g. a solution to be concentrated) arrives through a conduit 180. A pump 184 provided in a conduit 182 connected to conduit 180 drives the feed fluid through a heat exchanger 186 where it is partly evaporated. Evaporation heat is supplied by heating steam introduced through a conduit 188. By yielding its heat in heat exchanger 186 the heating steam condenses. Its condensate withdraws through a conduit 190.

Vapours forming in heat exchanger 186 flow, together with unevaporated portions of the feed fluid, through conduit 182 into a separator or demister 192. From here, demisted vapours are discharged through a conduit 194. Separated droplets are, together with the concentrate, partly reintroduced into heat exchanger 186, and partly withdraw through a conduit 196.

Such evaporators are already known even in shell structure. As an example the APV plate-type film evaporators can be mentioned where, however, each evaporation stage is provided with a pump and a separator outside the shells.

The present invention permits to incorporate such exterior pumps 184 and separators 192 into the shells proper whereby plate-type evaporators become even more compact as to their structure and more simple as to their operation.

Figure 24:
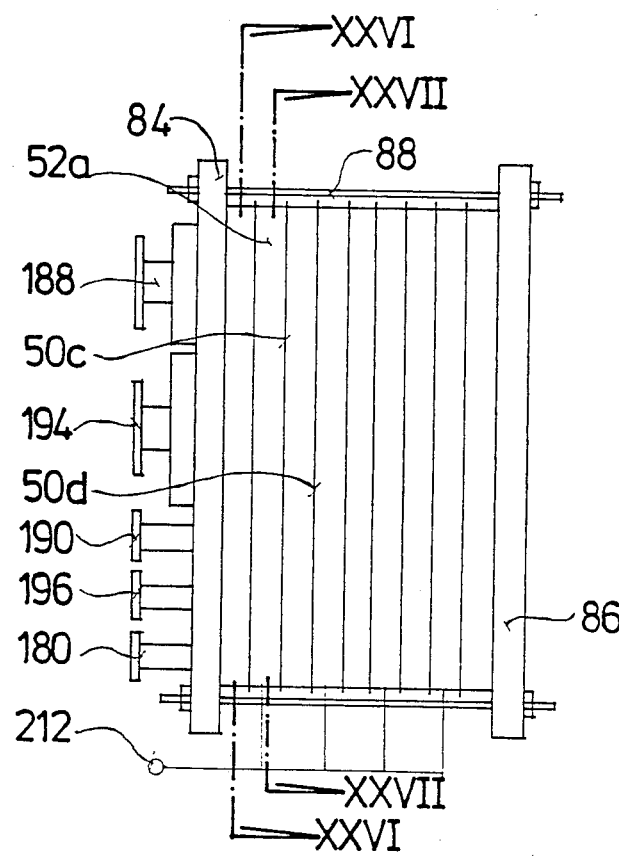
FIG. 24 is a lateral view of an evaporator stage consisting of shells according to the invention and comprised by the evaporator shown in FIG. 23.
Figure 25:
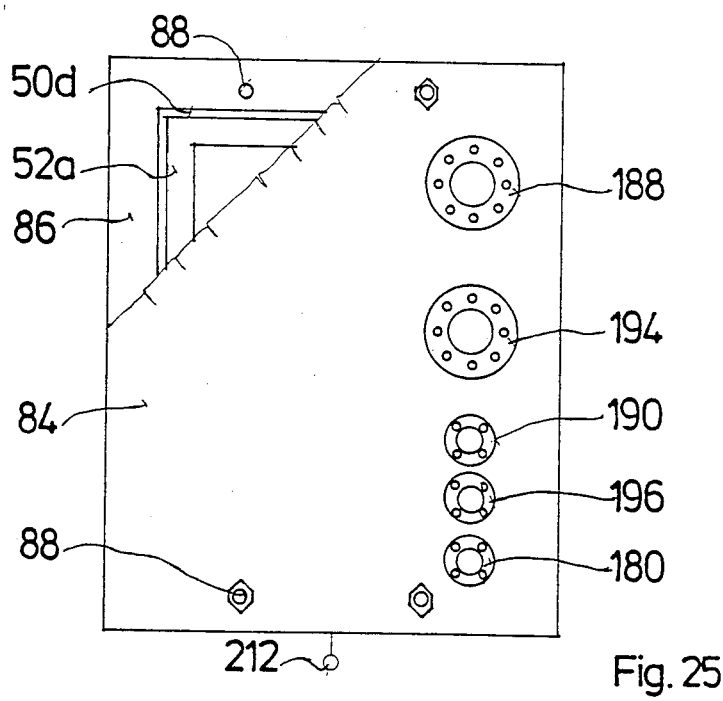
FIG. 25 shows a front view of the evaporator stage illustrated in FIG. 24.

The assembly of shells of such evaporators is represented in FIGS. 24 and 25.

The shells of the evaporator are mutually fixed between frames 84 and 86 by bolts 88 as was the case with the previously described apparatus. The various fluids of an evaporation process enter into and withdraw from the shells through stubs which correspond to conduits 180, 188, 190, 194 and 196 and, therefore, are specified by the same reference numerals.

In the instant case two sorts of shells are pairwise employed which are composed of two sorts of spacers and confining plates.

Figure 26:
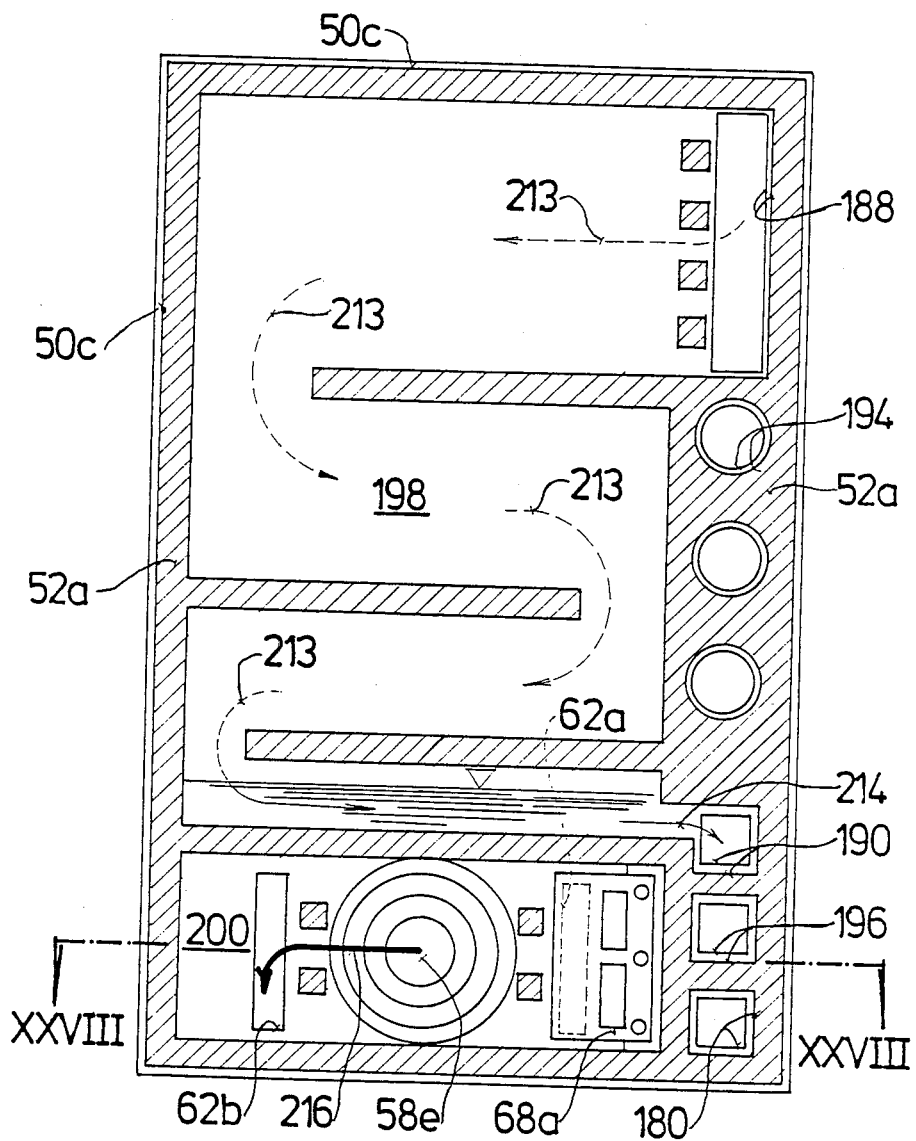
FIG. 26 represents a longitudinal sectional view taken along line XXVI—XXVI of FIG. 28 and indicated also in FIG. 24.

FIG. 26 shows spacer 52a and confining plate 50c of one of the pairwise employed shells. Frame 86 and bolts 88 are dismissed from the drawing for sake of clarity.

Spacer 52a comprises cavities 180, 188, 190, 194 and 196 for conducting the various fluids of the evaporation process as will be apparent on basis of FIG. 23. These cavities are similar to those described in connection with the apparatus shown in FIGS. 7 to 14 and form likewise channels in the assembly of shells. Therefore, they are specified by the same reference characters as the cavities of which they are composed. Cavity 188 for introducing heating steam into and cavity 190 for discharging the condensate of the former from individual shells are connected with chamber 198 within the shells. The lower portion of spacer 52a comprises a chamber 200 adjacent to a diaphragm pump and entirely separated from chamber 198.

Confining plate 50c behind spacer 52a is provided with orifices associated with cavities and channels 180, 188, 190, 194 and 196. Its lower portion comprises a diaphragm 58e adjacent to chamber 200 at both sides of which there are valve seats 62a and 62b. Structurally, diaphragm 58e and valve seats 62a and 62b are identic with diaphragm 58 shown in FIGS. 1 and 2 and with valve seat 62 illustrated in FIGS. 5 and 6, respectively. Valve seat 62a is closed by a diaphragm plate 68a fixed to spacer 52a in the manner of fixing shown likewise in FIGS. 5 and 6.

Figure 27:
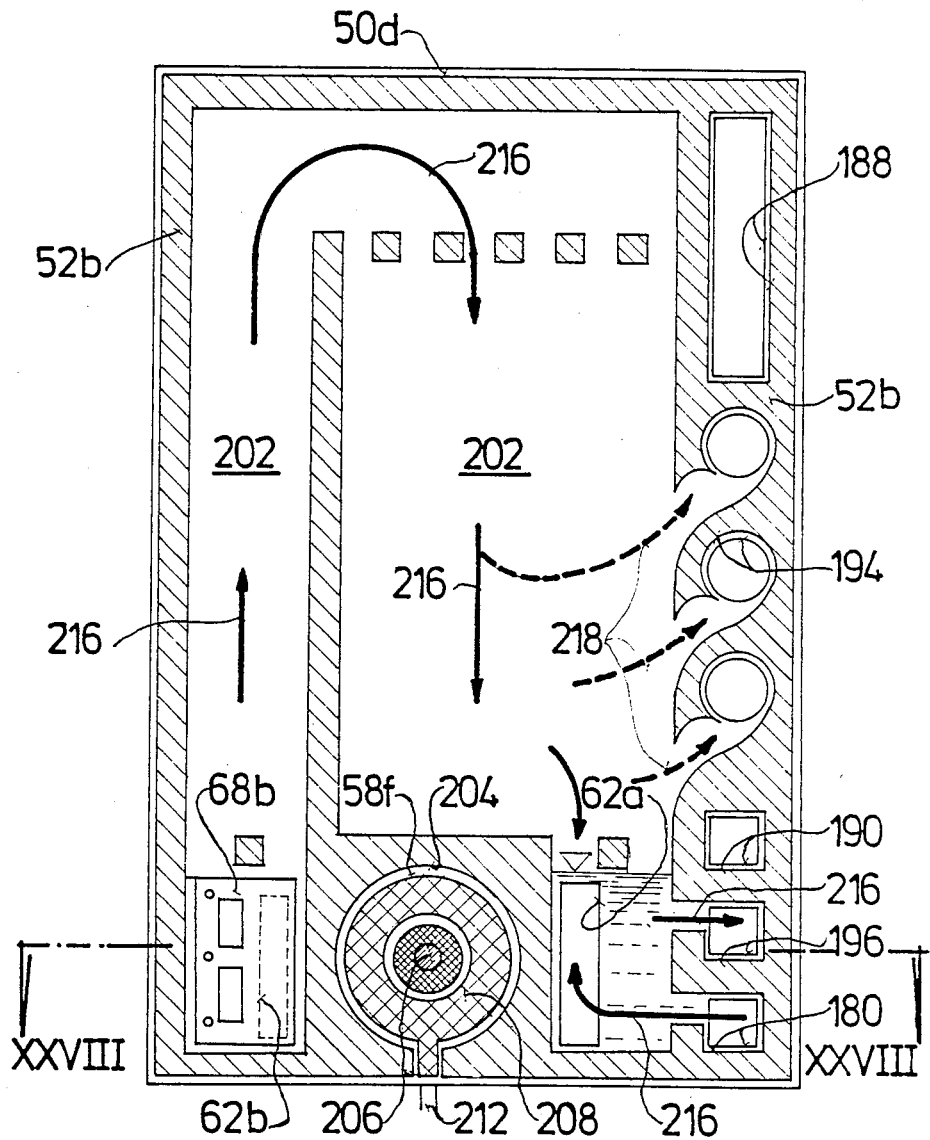
FIG. 27 is a longitudinal sectional view taken along line XXVII—XXVII of FIG. 28 and likewise indicated in FIG. 24.

Details of the other spacer 52b and the other confining plate 50d of the other member of pairwise employed shells go forth from FIG. 27 likewise with no illustration of frame 86 and bolts 88.

Spacer 52b is again provided with orifices associated with cavities 180, 188, 190, 194 and 196 of which cavities 180, 194 and 196 are connected with a chamber 202 within the shell. Chamber 202 is subdivided by spacer 52b into a pair of shafts one of which is narrower than the other one. The lowermost portion of the shell comprises a cylindrical chamber 204 which is separated from chamber 202.

Confining plate 50d is provided, on the one hand, with orifices associated with cavities 180, 188, 190, 194 and 196. On the other hand, it is provided with a diaphragm 58f adjacent to and registering with cylindrical chamber 204. Valve seats 62a and 62b each at one side of diaphragm 58f open into chamber 202. Valve seat 62b is closed by a diaphragm plate 68b fixed to spacer 52b in the manner shown in FIGS. 5 and 6.

Figure 28:
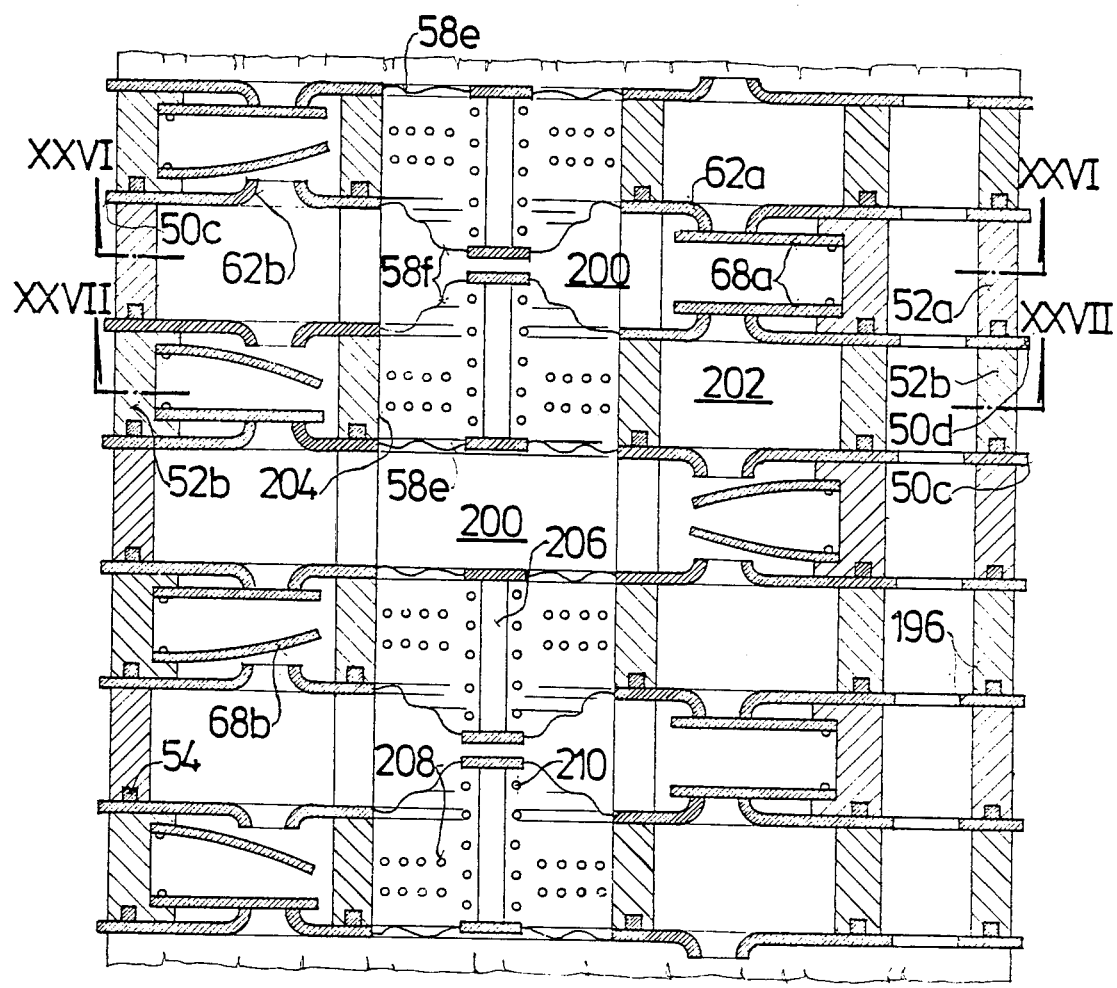
FIG. 28 illustrates a cross-sectional view taken along lines XXVIII—XXVIII of FIGS. 26 and 27.

FIG. 28 shows a group of such pairwise employed shells. As will be seen, the two sorts of confining plates 50c and 50d and the two sorts of spacers 52a and 52b alternate with one another which means that a shell 50c, 52a, 50d is followed by a shell 50d, 52b, 50c which is, in turn, followed again by a shell 50c, 52a, 50d, and so on. Adjacent shells have common confining plates which separate them from one another.

Since chambers 198 and 202 of the shells are connected all to channels 188 and 190 respectively to channels 194, 196 and 180, they form parallel connections as regards fluid flow. Thus, the instant case represents a single stage evaporator.

Furthermore, FIG. 28 shows that diaphragms 58e and 58f adjacent to chambers 204 form pairs displaced together. Since, as will be seen, no heat exchange takes place in chambers 200 and 204, the diaphragms confining them have no heat transfer functions and, therefore, may be operated more rapidly with the result of a more vigorous flow of fluid. Increased rapidity of diaphragm movements, however, can easier be obtained electrically than with hydraulic means which are notorious for their sluggish response to control impulses. Therefore, in the instant case electromagnetically operated diaphragms have been employed.

For the purpose of electromagnetic operation cooperating diaphragms are connected with each other by iron cores 206. Necessary electromagnetic fields are generated, in a manner known per se, in function of the technological requirements of evaporation. A generating system is suggested by coils 208 and 210 and an electrical input 212 (FIGS. 24 and 27).

Diaphragms 58f with back pressure valves 62a, 68a and 62b, 68b constitute diaphragm pumps which are similar to the diaphragm compressor 74 in FIG. 10.

In operation, heating steam introduced through channel 188 traversed the chambers 198 of shells 50d, 52a, 50c and, by yielding its heat across confining plates 50d and 50c, becomes condensed as symbolized by dashed thin arrows 213 and continuous thin arrows 214, respectively, in FIG. 26.

The feed liquid flows from channel 180 into chambers 202 of shells 50c, 52b, 50d (FIG. 27) and from here through open valve seats 62a into chambers 200 of shells 50d, 52a, 50c (FIG. 26).

Upon movements of diaphragms 58f (FIG. 28) of shells 50d, 52a, 50c and 50c, 52b, 50d facing each other in directions of mutual approach under the action of an electromagnetic field the feed liquid is put under pressure, the back pressure valves 62a, 68a leading into chambers 200 become closed, the back pressure valves 62b, 68b are opened, and the feed liquid rises in the narrower shaft of chamber 202 as suggested by continuous thick arrows 216 in FIGS. 26 and 27.

Continuous and dashed thick arrows 216 and 218, respectively, in FIG. 27 indicate how the feed liquid trickling down in the form of a falling film in the broader shaft in chamber 202 is partly evaporated by the heat of the heating steam transmitted across confining plates 50c and 50d.

Vapours evporated from the feed liquid withdraw through cavities 194 shaped as cyclones which cause droplets carried away by the withdrawing vapours to segregate and fall back into their parent liquid collected at the bottom of chamber 202. Details of such process are described in the reference mentioned hereinbefore. Surplus amounts of concentrated feed liquid are discharged from chamber 202 through channel 196 (FIG. 27).

Therewhile, as shown in FIG. 28, diaphragms 58e of adjacent pairs of shells are mutually removed and establish a depression in chambers 200 between such pairs. These chambers 200 are refilled with new amounts of feed liquid sucked in from chambers 202 through back pressure valves 62a, 68a under the action of depression.

The new amounts of feed liquid are delivered by diaphragms 58e again into chambers 202 in the course of their next stroke.

It will be seen that, in the course of one stroke, one group of diaphragm pumps is sucking while the alternate group discharges. In a next stroke their functions are reversed. Thus, the feed liquid in the shells is kept in pulsating circulation which means that the diaphragm pumps practically fulfill the role of the pump 184 shown in FIG. 23.

At the same time, the chambers 202 are periodically connected also with one another through the back pressure valves which means that, within the evporation stage composed of the shells, similar temperature and pressure conditions will prevail by way of mixing. Obviously, such uniform conditions are favourable in case of pairs of shells connected in parallel.

It will be recognized that all shells disclosed hereinbefore have confining plates which, in the exemplified embodiments, are distanced by spacers. As has been referred to, spacers have been illustrated to render the drawing more easily readable since embossments in the confining plates which could be used instead of spacers would unduly encumber the drawing.

Some of the exemplified shells are permanently closed which is a suitable expedient, known per se, to prevent possible leakages of precious working fluids and, thereby, a frustration of refrigeration cycles.

However, proper sealing could obviously be obtained by conventional dismantable means as well. In such cases the confining plates of the shells containing a working fluid may be regarded as belonging to either of a pair of adjacent shells.

The general concept of shells according to the invention can most easily be construed on basis of the shells of the evaporator shown in FIGS. 23 to 28. According to which of the spacers 52a and 52b is considered, shells 50c, 52a, 50d or 50d, 52b, 50c may be distinguished. In both cases the shells are designed in accordance with the present invention since in both cases the confining plates comprise a diaphragm and, thus, both shells comply with the basic requirements of the invention demanding at least one diaphragm in at least one of the confining plates.

Hereinbefore exemplified shelled apparatus have been described which are either refrigerators or evaporators. In all disclosed cases operation is based on heat exchange between various fluids which is rendered possible by the confining plates functioning as heat transfer surfaces. Such principle of operation is complemented by the present invention by ensuring the circulation of fluids by means of one or more diaphragms in the confining plates. Thereby, pumps outside and thermo-siphon inside the shells for circulation purposes may be dispensed with. Obviously, this means simplified equipment and increased reliability of operation. Thus, shells according to the invention are in all cases parts of thermal apparatus for carrying out thermo-dynamic processes based on heat exchange whether the process aims at refrigeration or evaporation. Consequently, such shells may be employed wherever a thermo-dynamic process based on heat exchange between circulated fluids is aimed at.

Providing the confining plates with diaphragms may be carried out by means of sheet technology in which case the diaphragms are fashioned from the confining plates themselves. Such methods will preferably be employed when the diaphragms serve for heat transfer as well as in case e.g. of diaphragms 58a (FIG. 10) or 58c and 58d (FIG. 20).

However, the diaphragms may also be inserts fixed in orifices of confining plates. Then, the material of the diphragms may be different from that of the confining plates. For instance, elastic discs made of plastic material may be employed for diaphragms as in case of diaphragms 58e and 58f (FIGS. 26 to 28).

The front surface of the diaphragms may be provided with a bracer plate as illustrated in case of diaphragms 58 (FIGS. 1 and 3), 58a and 58b (FIG. 12) and 58c and 58d (FIGS. 19 to 22). Such bracer plates may be of heat conductive or plastic material according to the functions of the diaphragms used for heat and/or pressure transmission.

I claim:

1. Shell for plate-type heat exchange apparatus comprising spaced heat conductive confining plates and fluid conducting passages therebetween,
    and diaphragms (e.g. 58e and 58f) on opposite sides of which flow the fluids undergoing heat exchange, said diaphragms being disposed in the confining plates of the shell and being pairwise interconnected by axially displaceable iron cores (206) arranged for cooperation with a generating system composed of coils (208, 210) and an electrical input (212) adapted to be energized according to a preselected program and arranged for pairwise mutually opposite operation (FIGS. 27 and 28).

2. Shell for plate-type heat exchange apparatus composed of a plurality of juxtaposed shells comprising spaced heat conductive confining plates and fluid conducting passages therebetween, characterized in that
    at least one of the confining plates (50) comprises at least one diaphragm (58) on opposite sides of which flow the fluids undergoing heat exchange, said diaphragm being arranged for alternating axial movements under the action of pressure changes in an adjacent fluid conducting passage (56) (FIGS. 1 and 2),
    and back pressure valves (62a, 68a; 62b, 68b) in a fluid conducting passage (56a, 56b) at diametrically opposite sides of a diaphragm (58a) in a confining plate (50b) of the shell to form a diaphragm pump (74, FIG. 10).

3. Shell for plate-type heat exchange apparatus composed of a plurality of juxtaposed shells comprising spaced heat conductive confining plates and fluid conducting passages therebetween, characterized in that
    at least one of the confining plates (50) comprises at least one diaphragm (58) on opposite sides of which flow the fluids undergoing heat exchange, said diaphragm being arranged for alternating axial movements under the action of pressure changes in an adjacent fluid conducting passage (56) (FIGS. 1 and 2),
    and the shell (162) contains a working fluid and is hermetically closed, at least one (50b) of said confining plates (50a, 50b) is provided with a pair of axially displaceable diaphragms (58c, 58d) each enclosing a passage (56f, 56g, respectively) with the other confining plate (50a) of the shell, said passages being connected with one another through a regenerative heat exchanger (150) between said diaphragms (FIG. 20).

4. Shell for plate-type heat exchange apparatus composed of a plurality of juxtaposed shells comprising spaced heat conductive confining plates and fluid conducting passages therebetween, characterized in that
    at least one of the confining plates (50) comprises at least one diaphragm (58) on opposite sides of which flow the fluids undergoing heat exchange, said diaphragm being arranged for alternating axial movements under the action of pressure changes in an adjacent fluid conducting passage (56) (FIGS. 1 and 2),
    and mean to alter the pressure in one said fluid thereby to pump another said fluid via said at least one diaphragm.

5. Shell for plate-type heat exchange apparatus composed of a plurality of juxtaposed shells comprising spaced heat conductive confining plates and fluid conducting passages therebetween, characterized in that
    at least one of the confining plates (50) comprises at least one diaphragm (58) on opposite sides of which flow the fluids undergoing heat exchange, said diaphragm being arranged for alternating axial movements under the action of pressure changes in an adjacent fluid conducting passage (56) (FIGS. 1 and 2),
    and at least one said diaphragm being of accordion-folded annular configuration and being of a heat conductive spring material.

6. Shell for plate-type heat exchange apparatus composed of a plurality of juxtaposed shells comprising spaced heat conductive confining plates and fluid conducting passages therebetween, characterized in that
    at least one of the confining plates (50) comprises a diaphragm (58) on opposite sides of which flow the fluids undergoing heat exchange, said diaphragm being arranged for alternating axial movements under the action of pressure changes in an adjacent said passage (56) (FIGS. 1 and 2),
    said diaphragm permanently separating two said passages, one of said two passages being said adjacent passage,
    and a control valve (60, 62, 58) (FIG. 3) operated by a diaphragm to control the flow of fluid through the other of said two passages.

* * * * *